(12) United States Patent
Thaker et al.

(10) Patent No.: US 7,995,748 B2
(45) Date of Patent: Aug. 9, 2011

(54) METHOD AND APPARATUS FOR PROVIDING ECRYPTION/DECRYPTION USING TWO SEQUENCES OF NUMBERS

(75) Inventors: Mihir Thaker, Fawkner (AU); Wei Li, Daly City, CA (US); Ashish Raojibhal Patel, Sunnyvale, CA (US)

(73) Assignee: France Telecom, Paris (FR)

( * ) Notice: Subject to any disclaimer, the term of this patent is extended or adjusted under 35 U.S.C. 154(b) by 1126 days.

(21) Appl. No.: 11/746,107

(22) Filed: May 9, 2007

(65) Prior Publication Data

US 2008/0279367 A1 Nov. 13, 2008

(51) Int. Cl.
*H04L 9/00* (2006.01)

(52) U.S. Cl. .......................................... 380/28; 380/29

(58) Field of Classification Search .................... 380/28, 380/29
See application file for complete search history.

(56) References Cited

OTHER PUBLICATIONS

X Y Yu/J Zhang/H E Ren/G S Xu/ X Y Luo, Chaotic Image Scrambling Algorithm Based on S-DES, (2006),p. 349-353.*

Delei Jiang/Bai Sen/Dong Wenming, An Image Encryption Algorithm Based on Knight's Tour and Slip Encryption-filter,(2008), p. 251-255.*

* cited by examiner

*Primary Examiner* — Vivek Srivastava
*Assistant Examiner* — Michael Anderson
(74) *Attorney, Agent, or Firm* — Thorne & Halajian, LLP; Gregory L. Thorne

(57) ABSTRACT

A method encrypting data including selecting a pair of sequences based on a seed, performing a transposition of the data utilizing elements of a first one of the pair of sequences to produce a first transposition result, and performing a transposition of the first transposition result utilizing elements of a second one of the pair of sequences to produce the encrypted data. The pair of sequences may be selected from a pool of constrained sequences. The pool of constrained sequences may be generated utilizing a Knights Tour sequence generating system. The pool of constrained sequences may be transferred to a decrypting device for decryption of the encrypted data. The pair of sequences may be randomly generated utilizing a random integer sequence generator and the seed. The constrained indication may be constrained to a number of sequences present in the pool of sequences.

36 Claims, 7 Drawing Sheets

|   | 1 | 2 | 3 | 4 | 5 | 6 | 7 | 8 |
|---|---|---|---|---|---|---|---|---|
|   | 1 | 2 | 3 | 4 | 5 | 6 | 7 | 8 |
|   | 9 | 10 | 11 | 12 | 13 | 14 | 15 | 16 |
|   | 17 | 18 | 19 | 20 | 21 | 22 | 23 | 24 |
|   | 25 | 26 | 27 | 28 | 29 | 30 | 31 | 32 |
|   | 33 | 34 | 35 | 36 | 37 | 38 | 39 | 40 |
|   | 41 | 42 | 43 | 44 | 45 | 46 | 47 | 48 |
|   | 49 | 50 | 51 | 52 | 53 | 54 | 55 | 56 |
|   | 57 | 58 | 59 | 60 | 61 | 62 | 63 | 64 |
|   | A | B | C | D | E | F | G | H |

Row labels (leftmost column, bottom): 8, 7, 6, 5, 4, 3, 2, 1

FIG. 4

| 35 | 20 | 17 | 2  | 33 | 40 | 15 | 46 |
|----|----|----|----|----|----|----|----|
| 18 | 3  | 34 | 39 | 16 | 47 | 32 | 41 |
| 21 | 36 | 19 | 64 | 1  | 42 | 45 | 14 |
| 4  | 63 | 38 | 43 | 58 | 61 | 48 | 31 |
| 37 | 22 | 57 | 62 | 49 | 44 | 13 | 60 |
| 8  | 5  | 50 | 53 | 56 | 59 | 30 | 27 |
| 23 | 52 | 7  | 10 | 25 | 28 | 55 | 12 |
| 6  | 9  | 24 | 51 | 54 | 11 | 26 | 29 |

FIG. 5A

| 19 | 38 | 15 | 52 | 33 | 36 | 13 | 56 |
|----|----|----|----|----|----|----|----|
| 16 | 45 | 18 | 37 | 14 | 55 | 32 | 35 |
| 39 | 20 | 51 | 48 | 53 | 34 | 57 | 12 |
| 44 | 17 | 46 | 41 | 58 | 49 | 54 | 31 |
| 21 | 40 | 43 | 50 | 47 | 62 | 11 | 60 |
| 6  | 3  | 24 | 63 | 42 | 59 | 30 | 27 |
| 1  | 22 | 5  | 8  | 25 | 28 | 61 | 10 |
| 4  | 7  | 2  | 23 | 64 | 9  | 26 | 29 |

FIG. 5B

|   | A | B | C | D | E | F | G | H |
|---|---|---|---|---|---|---|---|---|
| 8 | 19 | 27 | 7 | 50 | 5 | 18 | 39 | 45 |
| 7 | 13 | 23 | 9 | 33 | 24 | 55 | 15 | 1 |
| 6 | 12 | 2 | 8 | 31 | 44 | 11 | 35 | 56 |
| 5 | 38 | 3 | 57 | 16 | 29 | 37 | 59 | 32 |
| 4 | 17 | 6 | 63 | 43 | 14 | 36 | 61 | 40 |
| 3 | 41 | 10 | 28 | 26 | 22 | 46 | 47 | 48 |
| 2 | 21 | 34 | 42 | 60 | 53 | 54 | 30 | 52 |
| 1 | 25 | 51 | 4 | 49 | 20 | 58 | 64 | 62 |

FIG. 6

METHOD AND APPARATUS FOR PROVIDING ECRYPTION/DECRYPTION USING TWO SEQUENCES OF NUMBERS

FIELD OF THE PRESENT SYSTEM

The present system relates to a method and apparatus for encrypting and decrypting content in a secure but simple way.

BACKGROUND OF THE PRESENT SYSTEM

Many systems exist for securely transferring data from one location to another that frustrate parties that attempt to intercept the data and discern the content of the data. These systems typically obfuscate the data in a way, wherein, in theory, only the intended recipient has a means to understand the data. In cryptographic terms, this obfuscation of data or plaintext is called encryption of the data.

In historical systems, encryption of the data was brought about by simple substitution and/or transposition systems. A substitution encryption system utilized a mapping of characters wherein an input character was mapped directly to an output character. For example, an "a" plaintext character always becomes an "x" output encrypted character. The decryption process performed the substitution in reverse in that and "x" encrypted character is mapped to produce the "a" plaintext character. Transposition encryption simply jumbles characters in a defined fashion so that, for example, "plaintext" may become "attixnlp" by selecting the third letter in each letter selection. In more complex systems, combinations of substitution may be utilized together with transposition.

As computing power has become more powerful, these earlier system have fallen out of favor due to the ease that simple patterns in the encryption may be readily discerned. Today, more complex systems of mathematical obfuscation are utilized. In many of these systems, a symmetric key or asymmetric key pair may be utilized as at least a portion of the encryption/decryption process. In operation, during an encryption of the content, a key is mathematically combined in a complex but explicit fashion with plaintext to perform the encryption of the plaintext. Decryption of the plaintext is similarly complex and explicit.

To solve many of the problems associated with managing key distribution, a Public Key Infrastructure (PKI) is created to manage creation, distribution, and revocation of keys. A problem exists in these systems in that a trusted third party is typically required to act as a key authority that is responsible for managing keys including revocation. Further, since a portion of the keys are typically secret and not intended for general distribution, a system is required for securely distributing the secret keys to the intended recipients. In addition, even after the keys are securely distributed, the process of combining the keys or some derivation of the keys with the plaintext is oftentimes a complex mathematical process that requires a substantial amount of computing power, particularly when the combination with the plaintext (encryption) or separation from the plaintext (decryption) is performed in real time.

Further, key creation is a very complex process wherein a seed is determined utilizing a number generator that typically utilizes some form of random input (e.g., time, surrounding temperature, radioactive decay using Geiger Counter etc.) to create random numbers that may directly be the seed or may be an input into the seed. The seed is thereafter mathematically manipulated to create a key for symmetric encryption/decryption or a key pair for asymmetric encryption/decryption. In one type of random number generator, the same output number is generated each time a same input number is utilized as a starting seed. The random umber generator in this application enables bounds to be put on the generator so that the random number generated is within a range of specific values. This system enables a random number to be generated at more than one source utilizing the same input value so that the same random number may be generated. This may simplify the key distribution process, but still requires substantial computing power which now must exist at each source of key creation. Further, this system is only as secure as the secret process utilized for key generation and plaintext encryption. This process is complicated when many keys or key pairs are required to manage distribution of data.

Encryption is utilized to distribute and control access to all kinds of data such as data distributed on optical disks and data distributed through broadcast or transmission mediums. For cable and satellite networks, most video content in the U.S. is sold on a package basis with different channels forming various package groups (eg. Basic, Expanded, Digital, Complete, On Demand etc.) that are encrypted to control access to authorized users. Some European countries have the concept of per channel access where each channel needs to be separately controlled. Management of a large number of keys for access control is too large a computing task for so-called thin-clients such as set-top boxes and other consumer side content delivery systems.

It is an object of the present system to overcome disadvantages and/or make improvements in the prior art.

SUMMARY OF THE PRESENT SYSTEM

The present system includes a system, method and device for encrypting data including selecting a pair of sequences based on a seed, performing a transposition of the data utilizing elements of a first one of the pair of sequences to produce a first transposition result, and performing a transposition of the first transposition result utilizing elements of a second one of the same pair of sequences to produce a second transposition result, wherein the second transposition result is the encrypted data. In one embodiment, the pair of sequences may be selected from a pool of constrained sequences. The pool of constrained sequences may be generated utilizing a Knights Tour sequence generating system. The pool of constrained sequences may be randomly ordered prior to selecting the pair of sequences. The pool of constrained sequences may be transferred to a decrypting device, for example in an asynchronous manner for decryption of the encrypted data at the decrypting device. The pair of sequences may be randomly generated (e.g., at an encryption side and a decryption side independently) utilizing a random integer sequence generator and the seed. The constrained indication may be constrained to a number of sequences present in the pool of sequences.

The seed may be generated by combining a unique number with a timestamp related to the time of generating the seed. The first and second transposition results may be stored in a 256-bit buffer during performing the first and second transpositions. The data may be parsed from a larger data stream. The first and second transpositions may be performed on other parsings of the larger data stream. The ordering of the elements of the first one of the pair of sequences may be utilized for determining an order of data in the first transposition result and the elements of the first one of the pair of sequences may be utilized to determine an ordering of bit selection of the data during the transposition of the data. The ordering of the elements of the second one of the pair of sequences may be utilized for determining an order of data in the second transposition result and the elements of the second one of the pair of sequences may be utilized to determine an ordering of bit selection of the data during the transposition of the first transposition result.

The encrypted data may be transferred utilizing a per-to-per (P2P) network. In one embodiment, the encrypted data may be transferred through a cable and/or a broadcast medium to a consumer electronics device, wherein decryption and rendering of the data is performed. Decrypting the encrypted data may include performing a transposition of the second transposition result utilizing elements of the second one of the pair of sequences to produce the first transposition result, and performing a transposition of the first transposition result utilizing elements of the first one of the pair of sequences to produce the data. The pair of sequences may be selected from a pool of constrained sequences made available during the encrypting and decrypting acts. A second pair of sequences may be selected based on information received as a portion of the data. The information may include an indication of when to select the second pair of sequences. The indication may contain an indication of a time when to select the received second pair of sequences. In another embodiment, the indication may contain an indication of which portion of the data to encrypt prior to selecting the second pair of sequences.

BRIEF DESCRIPTION OF THE DRAWINGS

The invention is explained in further detail, and by way of example, with reference to the accompanying drawings wherein:

FIG. 4 shows plaintext data bits arranged in an order of the bit position in a parsed portion (e.g., a 64-bit parsing) of the plaintext;

FIG. 5A shows an illustrative example of a FROM sequence in accordance with an embodiment of the present system;

FIG. 5B shows an illustrative example of a TO sequence in accordance with an embodiment of the present system;

FIG. 6 shows the encrypted data after application of each of a FROM sequence and a TO sequence to the plaintext of FIG. 4, in accordance with an embodiment of the present system.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, modeling tools, analysis techniques and methods are omitted so as not to obscure the description of the present system. It should be expressly understood that the drawings are included for illustrative purposes and do not represent the scope of the present system.

For purposes of simplifying a description of the present system, the term rendering and formatives thereof as utilized herein refer to providing content, such as digital media, such that it may be perceived by at least one user sense, such as a sense of sight and/or a sense of hearing. The terms data and plaintext as utilized herein are intended to include any type of data that is in a form that is suitable to be recorded in a memory device. For example, the term data should be understood to include audio and/or visual data, textual data, etc.

The system and method described herein address problems in prior art systems. In accordance with an embodiment of the present system, a device and technique is provided for encrypting/decrypting data in a secure yet efficient manner.

Figure 1:
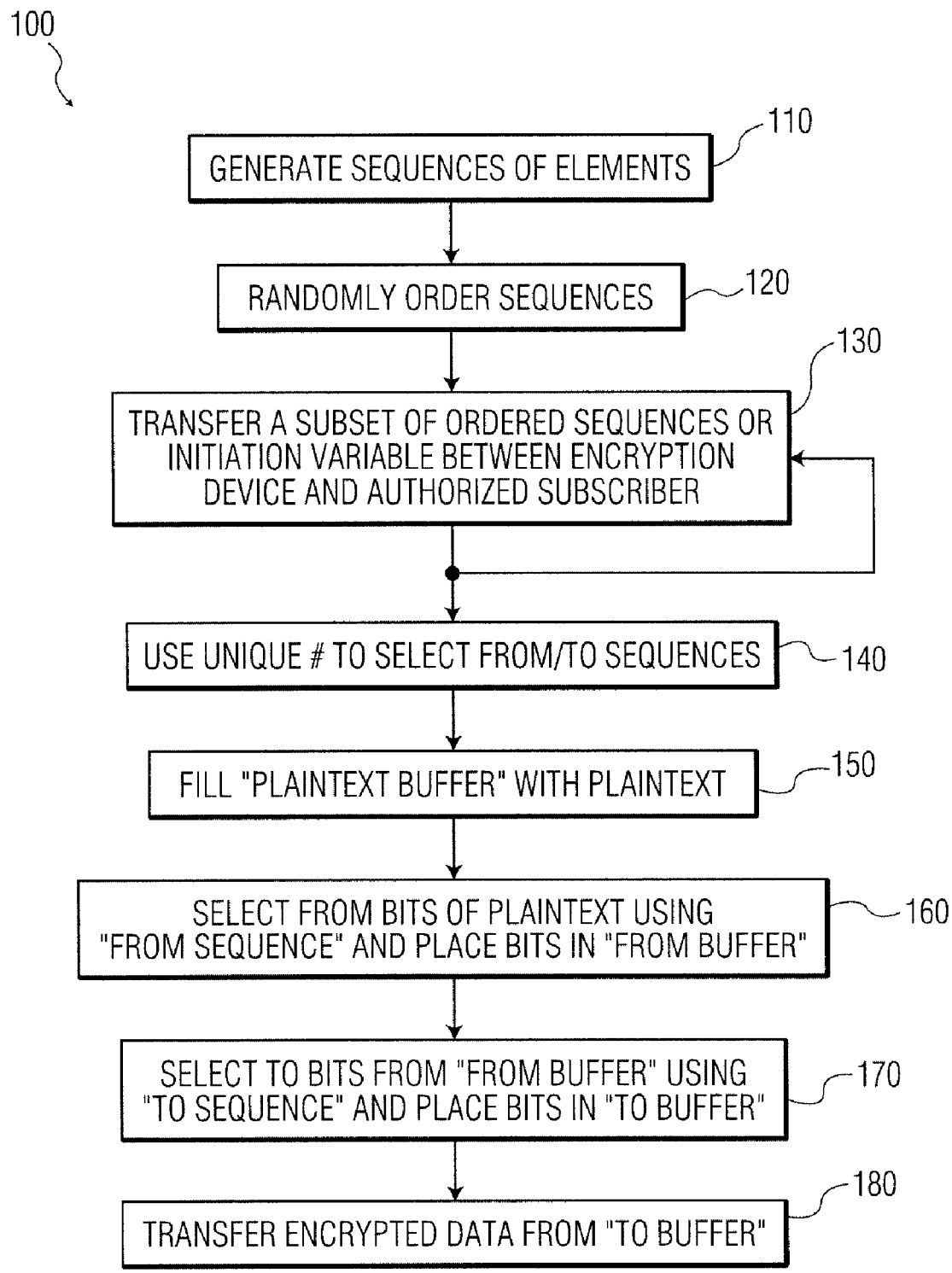
FIG. 1 shows a flow diagram including details of an encryption process that may be utilized to determine encryption/decryption sequences and to encrypt data.

FIG. 1 shows a flow diagram 100 including details of an encryption process that may be utilized to determine encryption/decryption sequences and to encrypt data. The process begins during act 110 wherein a large number of sequences are generated. As may be readily appreciated by a person of ordinary skill in the art, what constitutes a large number need not be precisely defined and may change depending on a desired security of the system. In encryption/decryption processes, the strength of the encryption/decryption process is often described in terms of a size of a key that is utilized to perform the encryption/decryption. In prior systems, larger keys provide more security but also increase the level of complexity in performing encryption/decryption. In the present system, a larger number of sequences provides more security without any significant increase in system complexity. In accordance with the present system, even if an unauthorized user determines the system utilized for generating the sequences, the unauthorized user will have no way of determining what subset of sequences are currently being utilized in general (e.g., see, act 130), or what particular sequences of the subset of sequences are being utilized for the encryption/decryption process (e.g., see act 140). However, in accordance with the present system, the encryption/decryption process is not rendered more complex since the sequences of numbers need only be generated once and may be generated prior to the encryption/decryption process.

The sequences are of a type termed "constrained sequences" in that the elements (e.g., numbers) of the sequence are selected from a given set of numbers. The term elements as utilized herein is intended to refer to identifiers that identify a particular bit position of the corresponding data and as such may be any system for identifying a given position and bit of data. For example, the elements of the sequence may be selected from the numbers 1 through 64. In this constrained sequence, each of the sixty-four elements/numbers is selected without repeating any of the elements/numbers in the constrained sequence. In accordance with the present system, any system of selecting the elements of the constrained sequence may be utilized. This sequence generation is repeated over and over a large number of times taking care to not repeat a sequence, thereby generating the sequences of elements during act 110.

During act 120, the order of storing the generated sequences may be randomly changed so that the order that the sequences where generated in is different than the order that the sequences are stored. This is not intended to be a reordering of the actual sequences that where generated. For example, in a set with one thousand different sequences that are generated in an order of one to one-thousand, the sequence order may be reordered so that the sequences are not stored from one to one-thousand. This step merely may be introduced to add an additional level of security so that even if an unauthorized user determines the method of sequence generation and sequence selection, the actual sequences applied may still be obfuscated. It should be noted that while a mere one-thousand sequences are illustratively discussed above, in actual practice it is likely that many more sequences would actually be employed (e.g., from millions to trillions of sequences) to reduce a possibility that an unauthorized user may try all sequences to determine the sequence(s) that are utilized in the encrypting process. However, in accordance with the present system, even as few as one-thousand or less sequences may be employed to provide a measure of security as described further herein.

In cryptographic terms, it is not possible to obfuscate data so that an unauthorized user can never determine the plaintext since given unlimited means and time, any system of encryption may be broken. The typical goal of encryption is an attempt to render the unauthorized decryption so difficult, that in effect, even if the data may eventually be decrypted by an unauthorized user applying brute-force means (e.g., an attempt at all possible combinations), the time and means required is greater than the benefit that may be derived from the unauthorized decryption.

During act 130, a subset of the randomly ordered sequences is utilized for encryption/decryption. This subset of the randomly ordered sequences is utilized for both encryption and decryption. Accordingly, the subset of randomly ordered sequences will be stored at both a source of content encryption (e.g., transmitter side, such as broadcast head-end) and wherein content decryption occurs (e.g., consumer receiver equipment). Accordingly, the subset of randomly ordered sequences may be periodically transferred between the encryption and decryption devices to ensure that each device is utilizing the same randomly ordered subset of sequences. In one embodiment, acts 120 and 130 may be combined wherein selection of the subset of sequences is performed in a manner to reorder the sequences. For example, the large number of sequences may be stored and selection of the subset of sequences is performed to reorder the sequences. In accordance with another embodiment of the present system, act 120 may be deleted altogether. The subset of sequences may be selected during act 130 and the device that performs the decryption process, may be provided with the subset of sequences that are utilized by the encryption process/device even in an embodiment wherein acts 120 and/or 130 are deleted.

In accordance with one embodiment, act 130 may be deleted and the encryption and decryption devices (e.g., see, FIG. 2) may separately generate the randomly ordered sequences and/or selected sequences (FROM and TO sequences) for example, utilizing a seed so that the same sequences and selected sequences are generated at both of the encryption and decryption devices. In this embodiment, the seed may include a time indication (e.g., time of seed generation) and/or other variables such as channel number, user ID, etc. for sequence generation to ensure that the same sequences are generated at the encryption and decryption devices without requiring a database transfer between the encryption and decryption devices. In an embodiment wherein sequence generation occurs at predetermined times, no exchange of data between the encryption and decryption devices is required for sequence generation. However, in a system wherein sequence generation at both of the encryption and decryption devices is initiated (such as by either of the encryption or decryption devices), transmission of an initiating variable is required during act 130. In another embodiment, key generation may utilize a random sequence generator to generate the sequences (e.g., prime number sequences, atomic decay sequences, etc.) which are time synchronized at the encryption and decryption devices, thereby requiring no other exchange of variables. In this embodiment, time may be the input seed to the random sequence generator which may be utilized to create sequences, such as Knight's tour sequences (see example discussed in more detail below), prime number sequences or any other random sequences as long as the sequences are repeatable when utilizing a given input seed.

In one embodiment, act 130 is performed again anytime that it is desired to change the subset of sequences, for example to deter a user from accessing data, wherein the user previously was an authorized user, but now is unauthorized. In this way, distribution of a new subset of sequences of the sequences generated during act 110 or creation of the new subset of sequences at both of the encryption and decryption devices may have a similar effect as key revocation and/or key distribution in prior systems. In other words, distribution of a new subset of sequences may be utilized to revoke a previous ability to decrypt the encrypted data as well as providing a newly authorized user an ability to begin decryption of the encrypted data. It may be desirable to change the subset of sequences, for example, periodically (at regular or irregular intervals), for a given amount of data exchange, or for any other criteria or combinations of criteria. As may be readily appreciated, a change in the subset of sequences that occurs too often may unduly burden the transmission system while a very infrequent alteration may compromise the security of the system and provide an unauthorized user sufficient time to analyze the encrypted content to determine the encryption process. In one embodiment in accordance with the present system, distribution of the subset of sequences may be limited to authorized users, although even given the subset of sequences, the actual decryption process is difficult to discern by an unauthorized user without additional information. Naturally, act 110 may also be performed to change the sequences of elements from which the subset of sequences is selected during act 130.

During act 140, a unique number associated with the data, data channel, particular user, broadcaster, etc., is utilized for selecting a pair of sequences from the subset of sequences. As may be readily appreciated, the unique number may be combined with other data (e.g., timestamp, GPS timing signal, computer time, received time, etc.) to determine a further unique number that is utilized for section of the pair of sequences. However the unique number is determined for selecting the pair of sequences, the same system will be typically utilized for determining the unique number and pair of sequences at a decrypting device as discussed further herein, for example regarding FIG. 2. Similarly and as made clear above, in an embodiment wherein the sequences are generated at both of the encryption and decryption devices, whether initiated by one of the devices or initiated by another event (e.g., periodically at intervals), the same unique number will be utilized at both of the encryption and decryption devices for generating the sequences.

In accordance with the present system, the pair of sequences (e.g., selected from the pool of sequences) is utilized in concert for both the encryption and decryption process as described herein. One of the pair of sequences is termed herein a "FROM sequence" while the other of the pair of sequences is termed a "TO sequence". The meaning of these terms will become clear from the description of the further acts of FIG. 1.

During act 150, a PLAINTEXT buffer may be filled with plaintext (e.g., unencrypted data), for example, taking a first bit of plaintext, and placing it in the first memory location of the PLAINTEXT buffer, although naturally other ordering may be utilized (e.g., first bit of plaintext is placed in a last bit position of the PLAINTEXT buffer) as long as the ordering is known by the system and is repeatable at both the encrypting and decrypting portions of the system. Each subsequent location of the PLAINTEXT buffer may be filled one after the other with the subsequent bits of the plaintext until the PLAINTEXT buffer is filled. In one embodiment, the size of the PLAINTEXT buffer corresponds to the number of elements in each of the constrained sequences. For example, for a sequence including each of the elements/numbers one though sixty-four (the numbers each being one of the elements of the constrained sequence), a total of sixty-four elements may be utilized in this embodiment with a PLAINTEXT buffer size of sixty-four bits. As may be readily appreciated different size buffers (e.g., 128, 256, etc.) and corresponding sequences may be utilized in accordance with the present system depending on a desired strength of the encryption system.

During act 160, bits of the plaintext are selected from the PLAINTEXT buffer in an order determined by the FROM sequence and are placed in a FROM buffer. For example, the first element of the FROM sequence may refer to a given bit position, such as bit position twenty-one of the plaintext. In accordance with an embodiment of the present system, the data in bit position twenty-one of the plaintext is placed in a corresponding bit position, such as bit position one, of the FROM buffer. The FROM buffer is filled bit-by-bit with the plaintext in an order determined by the order of the elements of the FROM sequence.

During act 170, bits of the data are selected from the FROM buffer in an order determined by the TO sequence and are placed in a TO buffer. For example, the first element of the TO sequence may refer to a given bit position, such as bit position forty-nine of the data. In accordance with an embodiment of the present system, the data in bit position one of the FROM buffer is placed in bit position forty-nine of the TO buffer. The TO buffer is filled bit-by-bit with the data from the FROM buffer in an order determined by the order of the elements of the TO sequence. In accordance with an embodiment of the present system, the TO buffer now contains the encrypted data that may be transferred during act 180, such as broadcasted, transmitted, etc. to the authorized user. As may be readily appreciated, the encrypted data may be transferred utilizing any system, such as a wired, wireless, optical system and/or combinations of these systems. For example, in one embodiment, the encrypted data may be transferred by a head-end of a cable network to a set-top box of an authorized user.

Naturally as each act is performed, a next plaintext portion may begin to be processed so that plaintext comprising more data bits than may fill the above buffers, may be encrypted and transferred in accordance with the present system. As may be readily appreciated, the encryption of subsequent plaintext portions need not await completion of act 180 since the encryption may operate in stages (e.g., each of acts 150 through act 180 may be viewed as separate stages of the encryption process). Each of the stages may operate in a serial manner pertaining to a given plaintext portion but may operate in parallel to receive subsequent plaintext portions after completing processing of a current plaintext portion.

Figure 2:
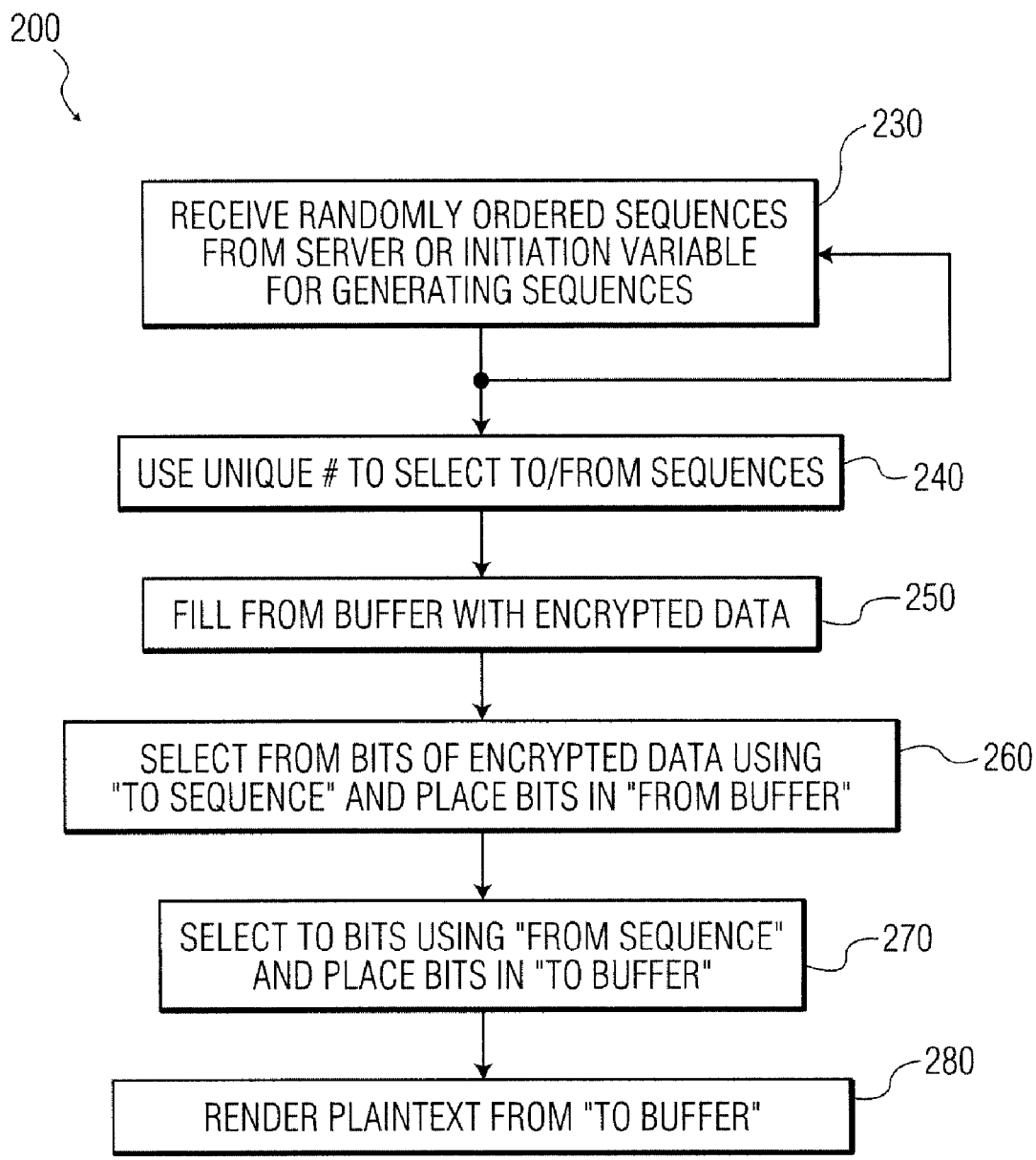
FIG. 2 shows a flow diagram including details of a decryption process that may be utilized to decrypt the data encrypted during the acts illustratively depicted in FIG. 1.

FIG. 2 shows a flow diagram 200 including details of a decryption process that may be utilized to decrypt the data encrypted during the acts illustratively depicted in FIG. 1. The process begins during act 230 wherein the subset of randomly ordered sequences is received by the decryption device, such as a set-top box of an authorized user. Act 230 may be repeated as a new subset of randomly ordered sequences is received, for example, from the encryption device (e.g., see act 130), thereby replacing a previous subset of randomly ordered sequences. In an embodiment wherein the encryption and decryption devices each generate the sequences, the initiation variable, whether received or generated in synchronization with the decryption device, may be utilized to generate the sequences.

During act 240, the unique number associated with the data, data channel, particular user, broadcaster, etc., that was utilized during the encryption process (e.g., see act 140) is utilized for selecting the pair of sequences from the subset of sequences. In accordance with the present system, the pair of sequences is the same pair of sequences that were selected during the encryption process. One of the pair of sequences is the "FROM sequence" while the other of the pair of sequences is the "TO sequence" that were utilized during the encryption process.

During act 250, an ENCRYPTED data buffer may be filled with the encrypted data received from the system (e.g., received from the TO buffer of the encryption device) in accordance with an embodiment of the present system. For example, a first bit of the encrypted data may be placed in the first memory location of the ENCRYPTED data buffer. As discussed regarding the encryption process, naturally other ordering may be utilized as long as the ordering is known by the system. Typically, the order of filling bits in the PLAINTEXT buffer is repeated at the ENCRYPTED data buffer of the decryption device. Each subsequent location of the ENCRYPTED data buffer may be filled one after the other with the subsequent bits of the encrypted data until the ENCRYPTED data buffer is filled. In one embodiment, the size of the ENCRYPTED data buffer corresponds to the size of the TO buffer of the encryption device, although as may be readily appreciated, different size buffers (e.g., 128, 256, etc.) may be utilized in accordance with the present system as long as the size of the buffer utilized during the encryption process is known by the decryption device to enable somewhat of a reverse reproduction of the encryption process to decrypt the data as described further herein. In one embodiment, each of the buffers utilized at both of the encryption and decryption devices are the same size or at least may be formed from two memories, one for each of the encryption and decryption devices that is accessed as having corresponding data buffers.

During act 260, bits of the encrypted data are selected from the ENCRYPTED data buffer in an order determined by the TO sequence and are placed in a FROM buffer. For example, the first element of the TO sequence may refer to a given bit position, such as bit position forty-nine of the encrypted text. In accordance with an embodiment of the present system, the data in bit position forty-nine of the encrypted data is placed in a corresponding bit position, such as bit position one, of the FROM buffer. The FROM buffer is filled bit-by-bit with the encrypted data in an order determined by the order of the elements of the TO sequence.

During act 270, bits of the data are selected from the FROM buffer in an order determined by the FROM sequence and are placed in a TO buffer. For example, the first element of the FROM sequence may refer to a given bit position, such as bit position twenty-one of the data. In accordance with an embodiment of the present system, the data in bit position one of the FROM buffer is placed in bit position twenty-one of the TO buffer. The TO buffer is filled bit-by-bit with the data from the FROM buffer in an order determined by the order of the elements of the FROM sequence. In accordance with an embodiment of the present system, the TO buffer now contains the plaintext that was encrypted during the process illustratively depicted in FIG. 1. The plaintext may now be rendered during act 180, such as played, displayed, etc. for the authorized user or be transferred to another device for rendering, storage, etc.

In accordance with an embodiment of the present system, one or more of the buffers (e.g., FROM buffer, TO Buffer) may be eliminated in the encryption device and/or the decryption device. For example, in the encryption device, plaintext present in the PLAINTEXT buffer may be selected data bit-by-bit utilizing the FROM sequence and placed in the ENCRYPTED data buffer data bit-by-bit utilizing the TO sequence without utilizing the FROM buffer. For the same sequence pair as discussed above regarding FIG. 1, the first element of the FROM sequence identifies the twenty-first data bit of the plaintext, which data may be placed in the forty-ninth bit position of the ENCRYPTED data buffer as determined by the first element of the TO sequence. The process in accordance with this embodiment may form the encrypted data without use of the FROM buffer. A similar operation may be performed at the decryption device, for example eliminating use of the FROM buffer in the decryption device.

In accordance with an embodiment, the selected pair of sequences may be changed from time to time, for example, by changing the randomly ordered sequences (e.g., see act 110), by changing the ordering of sequences (e.g., see act 120) and/or by changing the unique number utilized to select the pair of sequences. As may be readily appreciated, when the pair of sequences is changed at the encryption device, there should be a delay in time prior to implementing the change at the decryption device since the decryption device at the time of the change, is likely still decrypted data that was encrypted utilizing the prior pair of sequences. In one embodiment, the synchronization of the change in the pair of sequences may be simply implemented utilizing a time delay. For example, when there is a change of encryption sequences at the encryption device after time T, in order to account for the transmission delay between the encryption and decryption devices, the decryption device may change to the new sequences at time $T+T_x$. Delaying the change in the decryption device by the time $T_x$ enables synchronization of the encryption and decryption devices and thereby proper decryption of the data. In another embodiment, the encryption device may notify the decryption device that a change is about to occur by embedding a code in the data indicating an impending change in the encryption sequences. The code may be selected purposefully as being unlikely to occur in data sequences. For example, the code may be unique and/or may be repeated one or more times in the data to reduce a risk that the code occurs in the data without it being inserted by the encryption device. Insertion of the code by the encryption device, may indicate to the decryption device that a subsequent data sequence will be encrypted utilizing a new pair of sequences. In one embodiment, detection of the code occurrences one or more times may indicate that an immediately next data sequence will be encrypted with the new pair of sequences. In another embodiment, the code itself, a sequencing of the code, and/or additional data accompanying the code may indicate how long or how much data to wait prior to changing to the new pair of sequences for decrypting the data. In this way, the encryption device may ensure that the encryption and decryption devices are utilizing the same pair of sequences for a given data portion. Naturally, the encryption device typically will transfer the information for selecting the new pair of sequences prior to the time when the new pair of sequences will be required by the decryption device.

Figure 3:
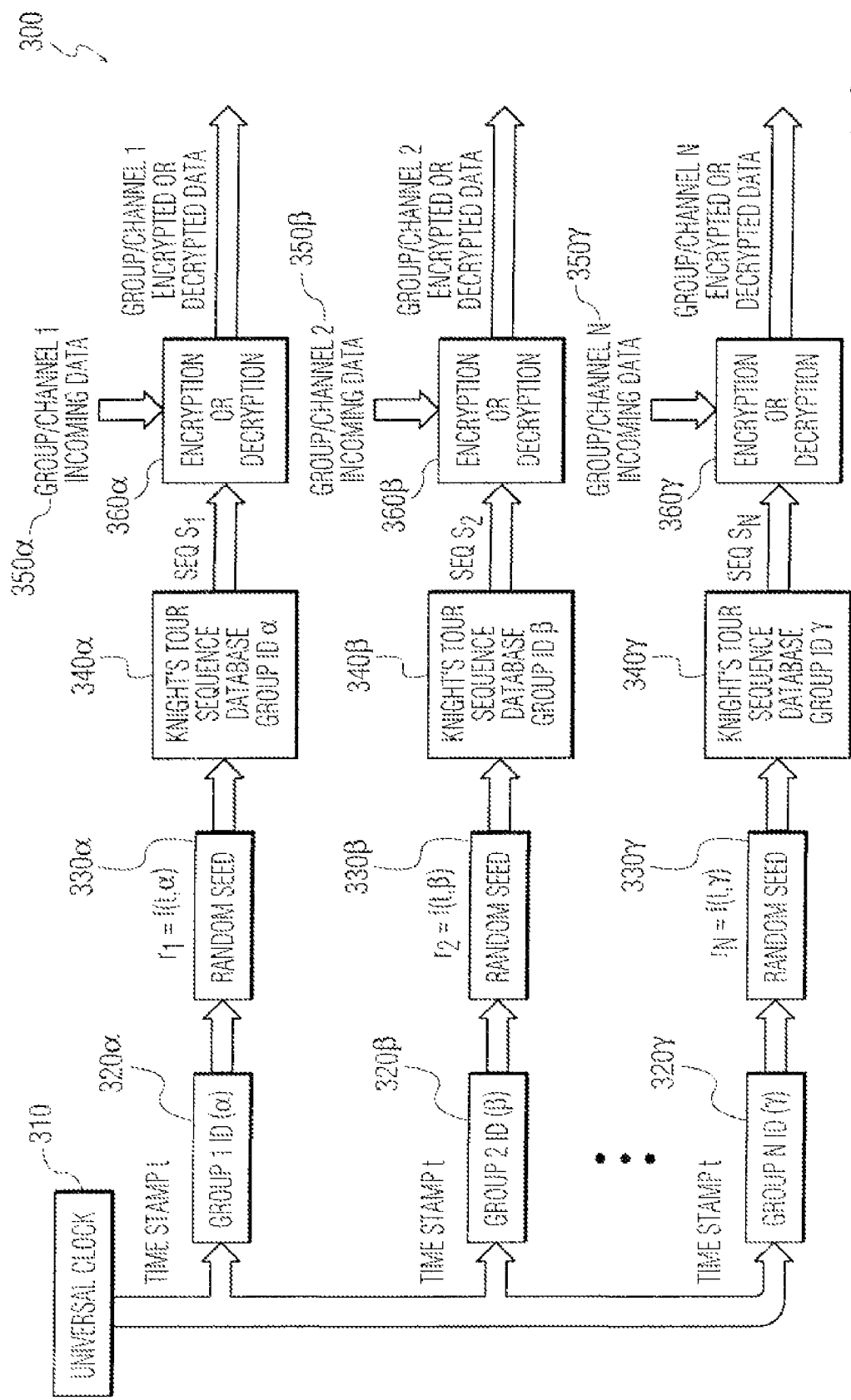
FIG. 3 shows a system design in accordance with an embodiment of the present system that may be utilized as either of an encryption or decryption device.

FIG. 3 shows a system design 300 in accordance with an embodiment of the present system that may be utilized as either of an encryption or decryption device. As shown, a universal clock 310 may be utilized to generate a timestamp "t". The timestamp t, together with unique group/channel identifiers 320, 320, . . . , 320, are fed to corresponding random sequence generators 330, 330, . . . , 330, for selection of unique pairs of sequences for each of the groups/channels from a sequence database, such as Knights Tour sequence databases 340, 340 . . . , 340. The random sequence generators 330, 330, . . . , 330 are constructed (programmed, configured, etc.) in such a way, that given a particular determined input, each would repeatably generate a same given output. The unique pairs of sequences for each of the groups/channels are utilized by an encryption/decryption engine (e.g., hardware and/or software) 360, 360, . . . , 360, to encrypt/decrypt corresponding incoming data 350, 350, . . . , 350. The encryption/decryption engines 360, 360, . . . , 360 each produce corresponding encrypted/decrypted data.

In accordance with the present system, the present process may be described in the following stages (an embodiment of which is illustrated in the system design depicted in FIG. 3):
1. Creation of a synchronized random seed
2. Randomized selection of a pair of sequences for encryption/decryption
3. Actual encryption/decryption
4. Avoiding unauthorized subscription and hacking attempts Illustratively, sequences may be generated (e.g., see act 110 of FIG. 1) utilizing a system of moving a knight on a chessboard, known as a Knights Tour. In this embodiment, the sequences are generated based on movement of a knight upon an empty chess board, with a stipulation that the knight must visit each square of the chess board exactly once. Each move of the knight during one open or closed "Tour" may be utilized as one of the elements of a given sequence. On an 8×8 chessboard there are several trillion solutions to the problem, of which about 13,267,364,410,532 have the knight finishing on a square from which it attacks the starting square. Such a tour is described as closed, otherwise the tour is described as open. The number of available completed tours of course is much higher for larger sized chessboards such as 16×16. Naturally, chessboards may be envisioned that have more or less squares or that have an unequal number of rows to columns of the chessboard. In accordance with an embodiment of the present system, the Knight's Tours sequences (e.g., both open and close tours) may be utilized for encryption and decryption of data, such as audio and video data.

Due to the ease of sequence selection and differentiation if desired, the present system may be readily applied to per channel access systems, such as cable and broadcast content systems. In accordance with an embodiment of the present system, each group or channel may be assigned a unique ID that may be utilized for creation of a random seed for encryption and decryption. Also, in order to have synchronization at the encrypting and decrypting devices, a universal number, such as generated by the universal clock 310, may be used for seeding purposes (eg. GPS timing signal, computer time, etc.). In one embodiment, the random seed, r may be computed as:

$$\gamma = f(T, \alpha) \quad (1)$$

where T is universal timestamp and is the unique channel or group identifier (e.g., the unique group/channel identifiers 320, 320, . . . , 320). As may be readily appreciated, other systems for generating the random seed may be readily applied. This random seed may be in turn fed to a random integer sequence generator (e.g., the random sequence generators 330, 330, . . . , 330) with the output bounds being a size of an available sequence database (N).

For a Knights Tour series of sequences, of all the available sequences (13 trillion+), a subset of unique sequences may be assigned to each group/channel so that no two sets have a common pair of sequences. In accordance with the present system, the pair of sequences may be a part of an overall assigned sequence database for each group or channel (e.g., the Knights Tour sequence databases 340, 340, . . . , 340). Furthermore, as discussed above, each pair of sequences has a 'TO' and 'FROM' sequence which is used for encryption and decryption purposes. Depending on the strength of encryption desired (e.g., for an 8×8 chessboard, the encryption strength is 64-bit and for 16×16 is 256-bit), the sequence length may vary from sixty-four elements (e.g., alphanumeric pairs) to 256 elements or greater that represent the various squares on a chess board. Hence, in accordance with an embodiment, a sequence might look like: a2 b4 c7 b5 d8 . . . .

In accordance with the present system, for added security, the available sequence database for each group or channel may be updated/changed as desired (e.g., every few weeks or months or earlier if desired) to prevent possible reuse of sequences. In one embodiment, rather than change the available sequences, an order of the sequences may be altered in a defined manner or some portion of the sequence database may be updated at both of the encryption and decryption devices to prevent reuse of sequence pairs without requiring a complete transmission of the sequence database.

In one embodiment, the random seed r may be used to create a sequence number S as, $$S = rand(\gamma), \quad (2)$$

where $0 < S <= N$, with N being the size of the available sequence database (e.g., see acts 140, 240). The sequence database (with N sequences) may be arranged randomly for each group or channel (e.g., see act 120). The value of S in this embodiment may correspond to the 'S' th sequence from the sequence database which will be used as one of the pair of sequences for content encryption/decryption. The second of the pair of sequences may be selected based on the Sth sequence (e.g., S+1 sequence, S−1 sequence, SXA, or any other defined combination thereof). In a multi-channel or multi-group application, other groups and/or channels may similarly select a unique sequence.

In accordance with an embodiment of the present system, incoming data may be encrypted/decrypted in real time. Rules may be applied for a regular change in the pairs of sequences. For example, for one or more of each group/channel, a new encryption pair of sequences may be chosen after time T, where T may be in seconds, minutes, hours, days, months or longer. Incoming data bits (e.g., plaintext or encrypted data) may be arranged linearly in an 8×8 (or other sized) register or buffer to represent a chessboard as shown in FIG. 4.

Illustratively, FIG. 4 shows plaintext data bits arranged in an order of the bit position in a parsed portion (e.g., a 64-bit parsing) of the plaintext. In accordance with the present system, the arranged bits may be encrypted in two stages. In a FROM stage, the data bits may be "read" from the buffer in accordance with a "FROM sequence" of the pair of sequences. In a TO stage, the data bits selected utilizing the FROM sequence, may be "written" to a new buffer according to a "TO sequence" of the pair of sequences.

For example, if the FROM sequence is as shown in FIG. 5A, then by that sequence, position E6 from the original buffer (21st bit of FIG. 4) will be read first and based on the TO sequence, as shown in FIG. 5B, will be written to position A2 (new buffer bit position 49). Similarly, position D8 (bit 4) will be read second according to the FROM sequence and will be written to position C1 (new buffer bit position 59). After application of each of the FROM sequence and TO sequence to the plaintext of FIG. 4, the complete original plaintext (portion) will be encrypted as shown in FIG. 6.

At the receiver (decryption device), the same pair of sequences for a given group/channel may be applied in reverse order to decrypt the data. By reverse order, what is meant is that the TO and FROM sequences that where utilized for encrypting the plaintext, are interchanged wherein the TO sequence is utilized for selecting bits from the buffer of FIG. 4, and the FROM sequence is utilized for placing bits in the buffer of FIG. 6 to recover the plaintext.

The sequence database for the subscribed groups/channels may be downloaded to the user (e.g., set-top box) at the time of subscription of a service (e.g., group or channel subscription) and only authorized users are downloaded the sequence database. Since the same universal clock and random number generation engine is available to the decryption unit, it invariably selects the same random sequence set for each subscribed group at both the encryption and decryption devices. In one embodiment, when there is a change of a pair of sequences after time T, in order to account for the transmission delay between the encryption and decryption units, the decryption unit may change to the new sequence at time $T+T_x$ (delay). This delay may be utilized to ensure synchronization and thereby proper decryption of data. In another embodiment, a change in the pair of sequences may be indicated by embedding a unique cue in the data (e.g., by the encryption device), that when decrypted by the decryption device, signifies an impending (e.g., based on time, data size, data delay, etc.) change in the pair of sequences. In one or more of these embodiments, the unique cue may also signify what system should be utilized for selection of the new pair of sequences. For example, the unique cue may signify to utilize a timestamp associated with the unique cue to select the new pair of sequences. In this embodiment, a regular period of sequence changes may be interrupted, for an unscheduled change or the period of change may be non-periodic. As may be readily appreciated by a person of ordinary skill in the art, other systems may be similarly applied for signaling a change/selection of the pair of sequences.

Figure 7:
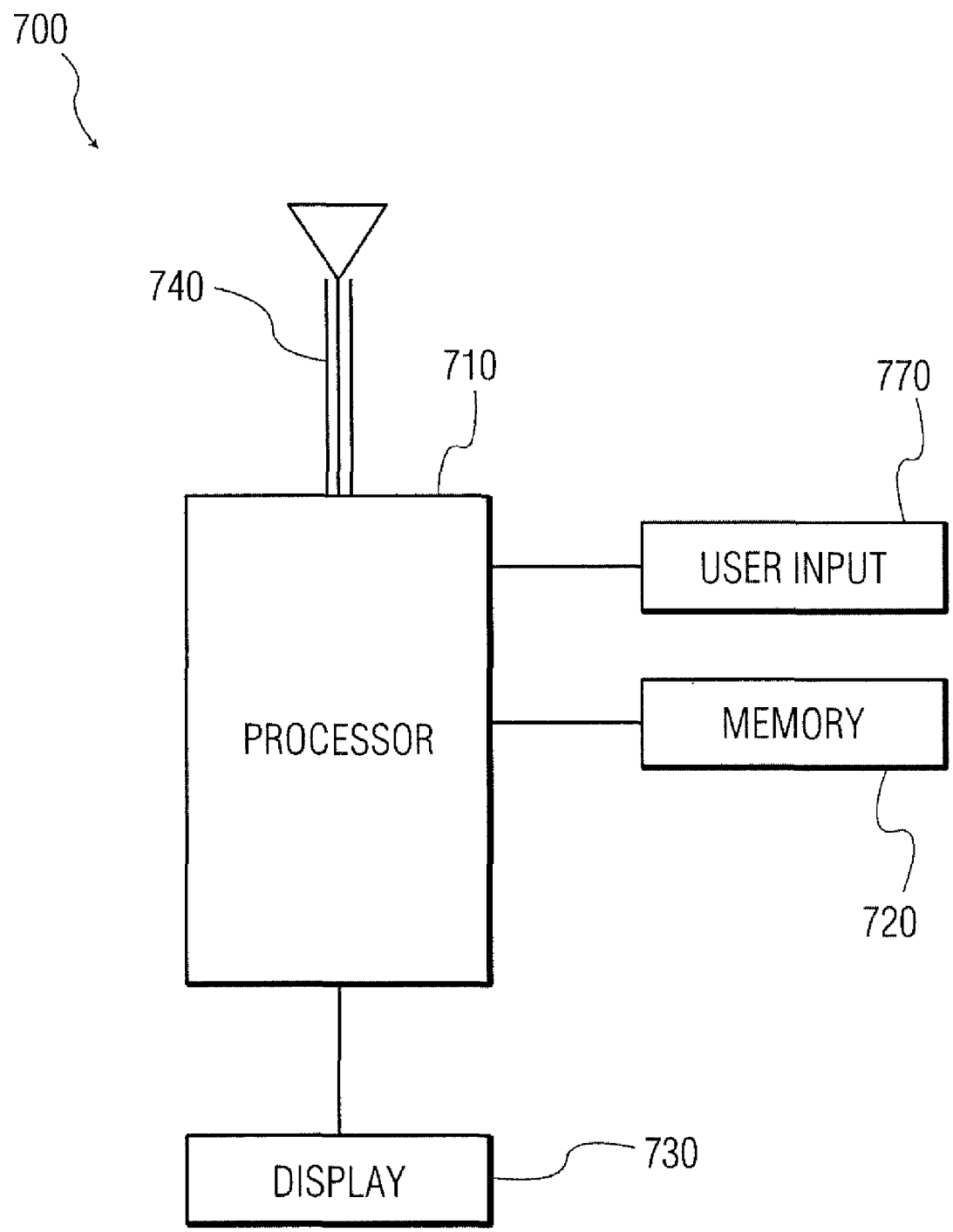
FIG. 7 shows a encryption/decryption device in accordance with an embodiment of the present system.

FIG. 7 shows a encryption/decryption device 700 in accordance with an embodiment of the present system. The device has a processor 710 operationally coupled to a memory 720, a display 730, a user input device 770 and a connection 740 to receive and/or transmit data such as plaintext and/or encrypted/decrypted data. The connection 740 may be a wired, wireless, optical, and/or other system or combination thereof for transferring data to and/or from the encryption/decryption device 700. For example, one or more portions of the connection 740 may include one or more of a cable head-end communication system, cable network, satellite broadcast network, terrestrial broadcast network, Local Area Network (LAN), Virtual Private Network (VPN), and or a devices local communication bus. In one embodiment for decrypting audio and/or visual content, the device 700 may be embedded in a consumer electronics device such as a television, audio player, audio-video player and other devices of the like. In this system, the content may be transferred in an encrypted state to the content rendering device which may perform the decryption of the content locally and/or only through a trusted network. In accordance with this embodiment, a system is achieved wherein unencrypted content is not distributed and/or made assessable to any party including an unauthorized or non-compliant device as understood by a person of ordinary skill in the art.

The memory 720 may be any type of device for storing programming application data, such as to support a user interface (e.g., GUI), as well as other data, such as sequence sets, pairs of sequences, unique IDs, plaintext, encrypted/decrypted data, input/output buffers, FROM/TO buffers, etc. The programming application data and other data are received by the processor 710 for configuring the processor 710 to perform operation acts in accordance with the present system. The operation acts may include controlling the display 730 to display a graphical user interface (GUI) for user interaction with the present system, and configuring the processor 710. The user input 770 may include a keyboard, mouse, trackball, accelerometer or other device, such as a touch sensitive display, which may be stand alone or be a part of a system, such as part of a personal computer, personal digital assistant, a rendering device (e.g., MP3 player) and/or display device for communicating with the processor 710 via any type of link, such as a wired or wireless link (e.g., connection 740). The user input device 770 is operable for interacting with the processor 710 including interaction within a paradigm of a GUI for interaction with elements of the present system, such as instigation of a change in encryption/decryption sequence pools, portions thereof, and/or pairs of sequences. Clearly the processor 710, memory 720, display 730, user input device 770, and/or content rendering device 740 may all or partly be a portion of a computer system or other device, such as a dedicated content rendering device (e.g., portable music player), cable head-end, set-top box, etc. In one embodiment, the present system may be applied wherein encryption of content is performed on a device local to the user (e.g., content rendering device, PDA, etc.), such as for a safe encrypted storage/back-up of local content. In another embodiment, one or more portions of the device may be utilized as part of a per-to-per (P2P) communication system.

The methods of the present system are particularly suited to be carried out by a computer software program, such program containing modules corresponding to one or more of the individual steps or acts described and/or envisioned by the present system. Such program and elements thereof may of course be embodied in a computer-readable medium, such as an integrated chip, a peripheral device or memory, such as the memory 720 and/or other memory coupled to the processor 710.

The memory 720 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, a wireless channel using time-division multiple access, code-division multiple access, other radio-frequency and/or wireless communication channel). Any medium known or developed that may store and/or transmit information suitable for use with a computer system, processor 710, etc., may be used as the memory 720.

Additional memories may also be used. The memory 720, and/or any other memories may be long-term, short-term, or a combination of long-term and short-term memories. These memories may configure the processor 710 to render the GUIs and implement the methods, operational acts, and functions disclosed herein. The memories may be distributed or local and the processor 710, where additional processors may be provided, may also be distributed or may be singular. For example, the GUI may be embedded in a web-based application that is wholely or partially provided by a remote processor. The memories may be implemented as electrical, magnetic or optical memory, or any combination of these or other types of storage devices. Moreover, the term "memory" should be construed broadly enough to encompass any information able to be read from or written to an address in the addressable space accessible by a processor. With this definition, information on a network is still within memory 720, for instance, because the processor 710 may retrieve the information from the network for operation in accordance with the present system.

The processor 710 is capable of providing control signals and/or performing operations in response to input signals from the user input device 770 and executing instructions stored in the memory 720. The processor 710 may be an application-specific and/or general-use integrated circuit(s). Further, the processor 710 may be a dedicated processor for performing in accordance with the present system and/or may be a general-purpose processor wherein only one of many functions operates for performing in accordance with the present system. The processor 710 may operate utilizing a program portion, multiple program segments, and/or may be a hardware device utilizing a dedicated or multi-purpose integrated circuit. Further, in a distributed system, portions of an operation may be performed on one device with data generated therefrom being transferred to one or more further devices.

The present system/device/method provides numerous benefits of prior systems. For example, through use of the present system/device/method in accordance with an embodiment, unauthorized usage and/or attempts at "hacking" the system may be averted in one or more of the following ways:

1. An unauthorized subscriber for a specific group or channel typically will not have the sequence database downloaded onto their set top boxes. Hence, the random number generator engine cannot function as it does not have the unique channel or group information for sequence selection apart from the fact that there does not exist for the unauthorized user a database to select sequences from.

2. Since, the encryption/decryption sequence is changed periodically (e.g., every few times a day) and/or non-periodically, it makes it harder & useless for the unauthorized user/hacker to crack it.

3. The sequence database that is available to an authorized user may updated periodically and/or non-periodically to avoid it from being stale and overused. In accordance with an embodiment of the present system, the updated sequence database may be easily accomplished via a software download.

Prior Conditional Access (CA) technologies typically utilize PKI for hardware or software based encryption. Due to key life cycle management issues such as revocation, such conditional access mechanisms require an exchange of keys at predefined intervals and require significant resources (computing, memory, power, etc.) to perform encryption and decryption of data. In contrast with the present system, due to the low computing power required, it may be readily applied in applications wherein the encryption/decryption is performed on so-called thin client systems wherein system resources are reduced, for example with a goal of reduction in power consumption and system costs, such as portable devices like cellular telephones, Personal Digital Assistants (PDAs), set-top boxes and other systems of the like. In addition, the present system may be readily applied to full computing platforms to facilitate a simplified life cycle management for encryption sequences which facilitates encryption sequences based on customer requirements in real time while not requiring excessive computation power for the encryption and decryption devices.

The present system enables real time encryption and decryption while requiring no key/sequences exchanged in real time. In accordance with the present system, sequences may be updated and changed periodically or upon request while enabling a potentially software and/or hardware based implementation requiring very low computing power. Further, encryption strength of 256-bits or greater may be provided if desired without a dramatic increase in requirements for system resources to provide a granular implementation with a high security mechanism for encryption. In accordance with an embodiment of the present system, the data may be transmitted/received shortly after/before the encrypting of the data. For example, the data may be exchanged between the encrypting and decrypting devices utilizing one or more of satellite and cable TV networks in real-time.

As may be readily appreciated, the present system is also applicable for end to end, synchronous and non-communicating encryption and decryption entities. Further, the present system may be readily applied to channel scrambling & encryption for Point to point (P2P) or Point to Multipoint (PMP) data, such as audio, video and data broadcast, multicast or unicast systems or applications, Conditional Access (CA) solutions as part of a Digital Rights Management (DRM) solution or digital television, channel scrambling technology for an Internet Telephony (IT) system, cable & satellite TV systems, corporate data encryption/decryption, and any other system wherein encryption and decryption of data is desired.

Of course, it is to be appreciated that any one of the above embodiments or processes may be combined with one or more other embodiments and/or processes or be separated and/or performed amongst separate devices or device portions in accordance with the present system. In addition, while the present system is described in terms of utilizing a pair of sequences for encryption/decryption, as maybe readily appreciated, three or more sequences may also be suitably applied wherein a first transposition result based on a first sequence, is transferred to produce a second transposition result based on a second sequence, which in turn is transferred to produce a third transposition result based on a third sequence, and so in (if desired).

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method of encrypting data, the method comprising acts of:
   an encrypting device
      selecting a pair of sequences based on a seed;
      performing a transposition of the data utilizing elements of a first one of the pair of sequences to produce a first transposition result; and
      performing a transposition of the first transposition result utilizing elements of a second one of the pair of sequences to produce a second transposition result, wherein the second transposition result is the encrypted data.

2. The method of claim 1, wherein the act of selecting the pair of sequences comprises selecting the pair of sequences from a pool of constrained sequences.

3. The method of claim 2, comprising an act of the encrypting device generating the pool of constrained sequences utilizing a Knights Tour sequence generating system.

4. The method of claim 2, comprising an act of the encrypting device randomly ordering the pool of constrained sequences prior to selecting the pair of sequences.

5. The method of claim 2, comprising an act of the encrypting device transferring the pool of constrained sequences to a decrypting device.

6. The method of claim 2, comprising an act of the encrypting device randomly generating a constrained indication of the pair of sequences utilizing a random integer sequence generator and the seed, wherein the constrained indication is constrained to a number of sequences present in the pool of sequences.

7. The method of claim 1, comprising an act of the encrypting device generating the seed by combining a unique number with a timestamp related to the time of generating the seed.

8. The method of claim 1, comprising an act of the encrypting device storing the first and second transposition results in a 256-bit buffer during the acts of performing the first and second transpositions.

9. The method of claim 1, comprising acts of the encrypting device
   parsing the data from a larger data stream; and
   repeating the acts of performing first and second transpositions on other parsings of the larger data stream.

10. The method of claim 1, wherein the act of performing the transposition of the data comprises an act of utilizing an ordering of the elements of the first one of the pair of sequences for determining an order of data in the first transposition result while utilizing the elements of the first one of the pair of sequences to determine an ordering of bit selection of the data during the transposition of the data.

11. The method of claim 1, wherein the act of performing the transposition of the first transposition result comprises an act of utilizing an ordering of the elements of the second one of the pair of sequences for determining an order of data in the second transposition result while utilizing the elements of the second one of the pair of sequences to determine an ordering of bit selection of the first transposition result during the transposition of the first transposition result.

12. The method of claim 1, comprising an act of the encrypting device transferring the encrypted data utilizing a per-to-per (P2P) network.

13. The method of claim 1, comprising an act of the encrypting device transferring the encrypted data through one of a cable and broadcast medium to a consumer electronics device for rendering of the data.

14. The method of claim 1, comprising an act of a decrypting device decrypting the encrypted data, wherein the act of decrypting the encrypted data comprises acts of:
   performing a transposition of the second transposition result utilizing elements of the second one of the pair of sequences to produce the first transposition result; and
   performing a transposition of the first transposition result utilizing elements of the first one of the pair of sequences to produce the data.

15. The method of claim 14, wherein the acts of selecting the pair of sequences comprises selecting the pair of sequences from a pool of constrained sequences made available during the encrypting and decrypting acts.

16. The method of claim 1, wherein the pair of sequences is a first pair of sequences, the method comprising an act of the encrypting device selecting a second pair of sequences based on information received as a portion of the data.

17. The method of claim 16, wherein the information includes an indication of when to select the second pair of sequences.

18. The method of claim 17, wherein the indication contains an indication of a time when to select the received second pair of sequences.

19. The method of claim 17, wherein the indication contains an indication of which portion of the data to encrypt prior to selecting the second pair of sequences.

20. An application embodied on a computer readable non-transitory medium arranged to encrypt data, the application comprising:
   a portion arranged to select a pair of sequences based on a seed;
   a portion arranged to perform a transposition of the data utilizing elements of a first one of the pair of sequences to produce a first transposition result; and
   a portion arranged to perform a transposition of the first transposition result utilizing elements of a second one of the pair of sequences to produce a second transposition result, wherein the second transposition result is the encrypted data.

21. The application of claim 20, wherein the portion arranged to select the pair of sequences is arranged to select the pair of sequences from a pool of constrained sequences.

22. The application of claim 21, comprising a portion arranged to generate the pool of constrained sequences utilizing a Knights Tour sequence generating system.

23. The application of claim 21, comprising a portion arranged to randomly generate a constrained indication of the pair of sequences utilizing a random integer sequence generator and the seed, wherein the constrained indication is constrained to a number of sequences present in the pool of sequences.

24. The application of claim 20, comprising a portion arranged to generate the seed by combining a unique number with a timestamp related to the time of generating the seed.

25. The application of claim 20, wherein the portion arranged to perform the transposition of the data comprises a portion arranged to utilize an ordering of the elements of the first one of the pair of sequences for determining an order of data in the first transposition result while utilizing the elements of the first one of the pair of sequences to determine an ordering of bit selection of the data during the transposition of the data.

26. The application of claim 20, wherein the portion arranged to perform the transposition of the first transposition result comprises a portion arranged to utilize an ordering of the elements of the second one of the pair of sequences for determining an order of data in the second transposition result while utilizing the elements of the second one of the pair of sequences to determine an ordering of bit selection of the first transposition result during the transposition of the first transposition result.

27. A device configured to encrypt data, the device comprising:
   a memory; and
   a processor, operationally coupled to the memory, wherein the processor is configured by programming contained in the memory to:
   select a pair of sequences based on a seed;
   perform a transposition of the data utilizing elements of a first one of the pair of sequences to produce a first transposition result; and
   perform a transposition of the first transposition result utilizing elements of a second one of the pair of sequences to produce a second transposition result, wherein the second transposition result is the encrypted data.

28. The device of claim 27, wherein the memory contains a pool of sequences from which the pair of sequences is selected.

29. The device of claim 28, wherein the pool of sequences is a Knights Tour pool of constrained sequences.

30. The device of claim 28, wherein the processor is configured to randomly generate a constrained indication of the pair of sequences utilizing a random integer sequence generator and the seed, wherein the constrained indication is constrained to a number of sequences present in the pool of sequences.

31. The device of claim 27, wherein the processor is configured to generate the seed by combining a unique number with a timestamp related to the time of generating the seed.

32. The device of claim 27, wherein the processor is configured to utilize an ordering of the elements of the first one of the pair of sequences for determining an order of data in the first transposition result while utilizing the elements of the first one of the pair of sequences to determine an ordering of bit selection of the data during the transposition of the data.

33. The device of claim 27, wherein the processor is configured to utilize an ordering of the elements of the second one of the pair of sequences for determining an order of data in the second transposition result while utilizing the elements of the second one of the pair of sequences to determine an ordering of bit selection of the first transposition result during the transposition of the first transposition result.

34. The device of claim 27, wherein the pair of sequences is a first pair of sequences, wherein the processor is configured to select a second pair of sequences based on information received as a portion of the data.

35. The device of claim 34, wherein the information includes an indication of when to select the second pair of sequences.

36. The device of claim 34, wherein the indication contains an indication of a time when to select the received second pair of sequences.

* * * * *